United States Patent
Davidov et al.

(10) Patent No.: US 10,042,867 B2
(45) Date of Patent: Aug. 7, 2018

(54) GENERATING STORAGE PLANS IN STORAGE MANAGEMENT SYSTEMS

(71) Applicant: International Business Machines Corporation, Armonk, NY (US)

(72) Inventors: Barak Davidov, Petach-Tikva (IL); Rotem Klein, Kiryat Ono (IL); Nadav Parag, Rehovot (IL); Avraham S. Sabzerou, Ganey Tikva (IL); Moshe Weiss, Petah Tiqwa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/792,845

(22) Filed: Jul. 7, 2015

(65) Prior Publication Data

US 2017/0011069 A1 Jan. 12, 2017

(51) Int. Cl.
*G06F 17/30* (2006.01)
*G06F 3/06* (2006.01)
*G06F 9/54* (2006.01)

(52) U.S. Cl.
CPC ...... *G06F 17/30289* (2013.01); *G06F 3/0605* (2013.01); *G06F 3/067* (2013.01); *G06F 3/0617* (2013.01); *G06F 3/0653* (2013.01); *G06F 3/0659* (2013.01); *G06F 3/0685* (2013.01); *G06F 9/541* (2013.01)

(58) Field of Classification Search
CPC ............. G06F 17/30289; G06F 3/0605; G06F 3/0617; G06F 3/0653; G06F 3/0659; G06F 3/067; G06F 3/0685; G06F 9/541
See application file for complete search history.

(56) References Cited

U.S. PATENT DOCUMENTS

| | | | |
|---|---|---|---|
| 8,019,872 B2 | 9/2011 | Lora et al. | |
| 8,677,111 B2 | 3/2014 | Wu et al. | |
| 9,106,516 B1 | 8/2015 | Palmans et al. | |
| 2002/0194326 A1 | 12/2002 | Gold et al. | |
| 2008/0126734 A1 | 5/2008 | Murase | |
| 2010/0050172 A1 | 2/2010 | Ferris | |
| 2011/0010518 A1* | 1/2011 | Kavuri | G06F 9/50 711/165 |
| 2012/0005449 A1 | 1/2012 | Reed et al. | |
| 2012/0079175 A1* | 3/2012 | Flynn | G11C 7/1012 711/103 |
| 2012/0096165 A1 | 4/2012 | Madduri et al. | |

(Continued)

OTHER PUBLICATIONS

IBM et al., "Storage Management Automation", An IP.com Prior Art Database Technical Disclosure, Original Publication Date: Nov. 17, 2006, IP.com No. IPCOM000143254D, IP.com Electronic Publication: Nov. 17, 2006, pp. 1-2.

(Continued)

*Primary Examiner* — Michael Krofcheck
*Assistant Examiner* — William E. Baughman
(74) *Attorney, Agent, or Firm* — Stephen R. Yoder

(57) ABSTRACT

A method is provided to integrate a ticketing system into a storage management system. In such method, tickets are opened and translated to a set of recommended operations automatically, notifying and showing to a storage administrator the recommended operations as a set of actions and forms. The storage administrator is offered the ability including changing a step of the set of actions and re-ordering the set of actions.

11 Claims, 4 Drawing Sheets

250

(56) References Cited

U.S. PATENT DOCUMENTS

| | | |
|---|---|---|
| 2013/0263161 A1 | 10/2013 | Challa et al. |
| 2014/0149791 A1 | 5/2014 | Goodman et al. |
| 2014/0156926 A1 | 6/2014 | Chavda et al. |
| 2014/0181443 A1* | 6/2014 | Kottomtharayil ... G06F 11/1458 711/162 |
| 2014/0258537 A1 | 9/2014 | Schleimer et al. |

OTHER PUBLICATIONS

Iqbal et al., "SLA-Driven Adaptive Resource Management for Web Applications on a Heterogeneous Compute Cloud", M.G. Jaatun, G. Zhao, and C. Rong (Eds): CloudCom 2009, LNCS 5931, pp. 243-253, 2009, © Springer-Verlag Berline Heidelberg 2009.

U.S. Appl. No. 15/067,224 Entitled "Generating Storage Plans in Storage Management Systems", filed Mar. 11, 2016.

Appendix P.: List of IBM Patents or Patent Applications Treated as Related, 2 pages.

* cited by examiner

GENERATING STORAGE PLANS IN STORAGE MANAGEMENT SYSTEMS

BACKGROUND

The present invention relates generally to the field of storage management, and more particularly to generating automatic plans in storage ticketing systems.

In general, storage management refers to the technologies and processes organizations use to maximize or improve the performance of their data storage resources. Storage management may include virtualization, replication, mirroring, security, compression, traffic analysis, process automation, storage provisioning, and related techniques.

Storage management may bring forth many benefits to an organization, including: (i) allowing organizations to better unitize their existing storage; (ii) simplifying the management of storage networks and devices; (iii) improving a data center's performance; and/or (iv) helping a data center improve its reliability and availability.

SUMMARY

According to an aspect of the present invention, there is a method, computer program product and/or system for generating an automatic plan in a storage management system that performs the following operations (not necessarily in the following order): receiving a storage request through a ticketing system; transmitting the storage request to the storage management system; generating a plan for the storage request; and notifying a storage administrator of the plan; wherein: at least the step of generating a plan for the storage request is performed by computer software running on computer hardware.

DETAILED DESCRIPTION

Figure 1:
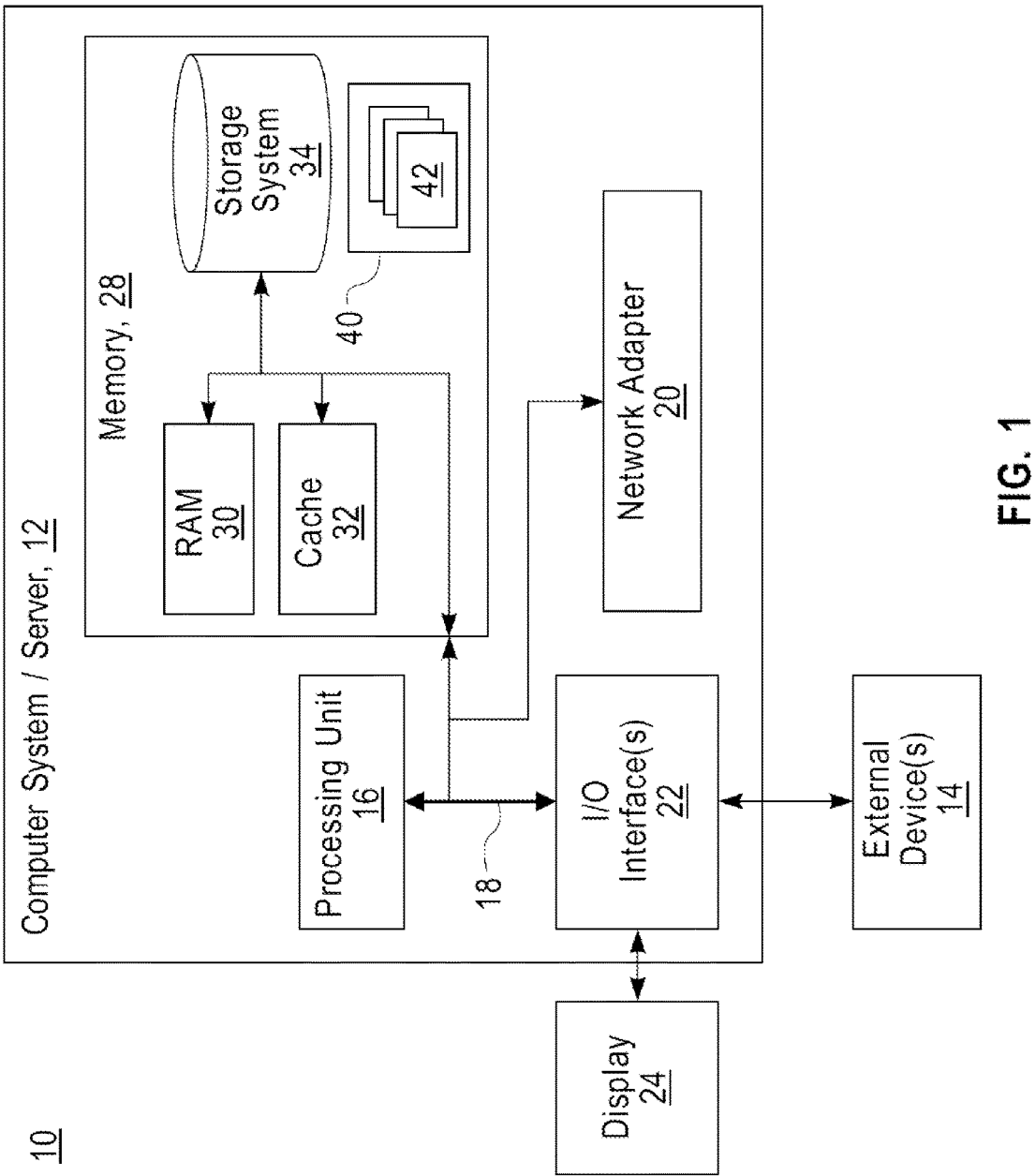
FIG. 1 depicts a cloud computing node used in a first embodiment of a system according to the present invention.

A method is provided to integrate a ticketing system into a storage management system. In such method, tickets are opened and translated to a set of recommended operations automatically, notifying and showing to a storage administrator the recommended operations as a set of actions and forms. The storage administrator is offered the ability including changing a step of the set of actions and re-ordering the set of actions. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
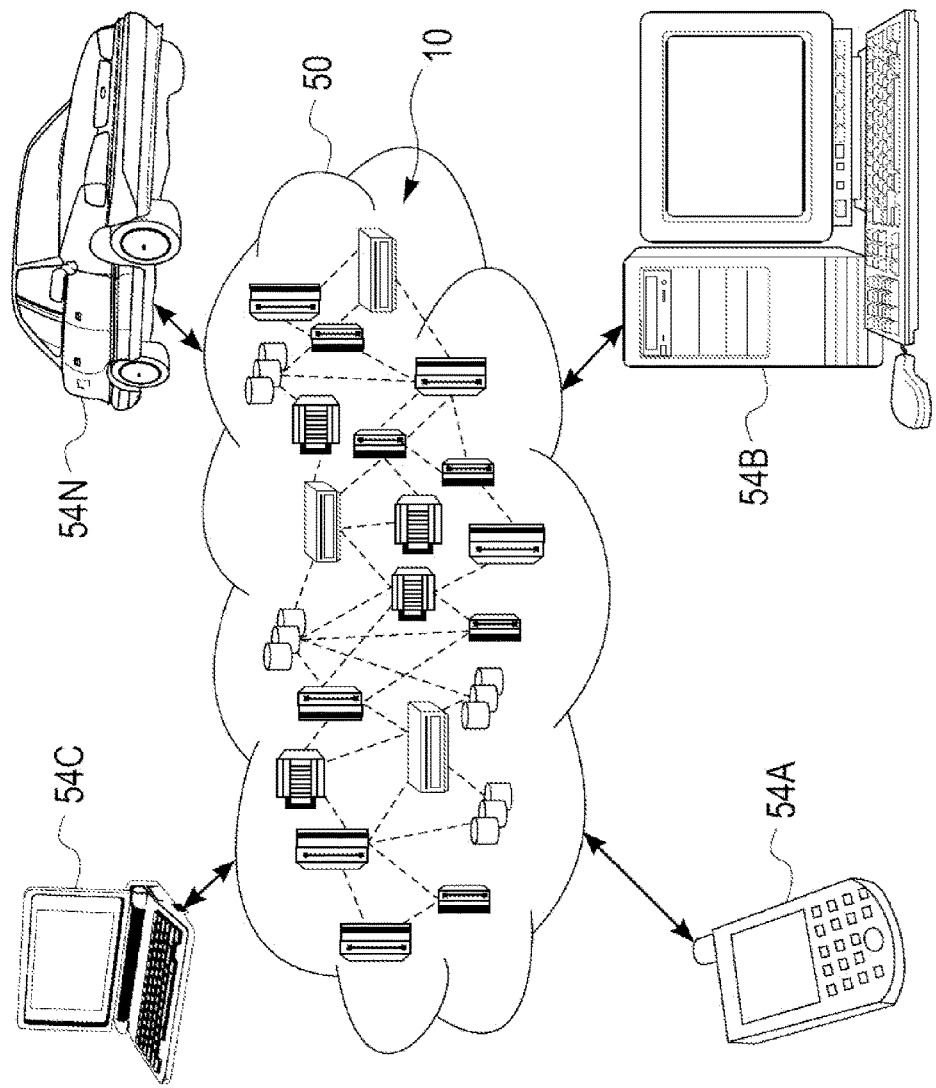
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
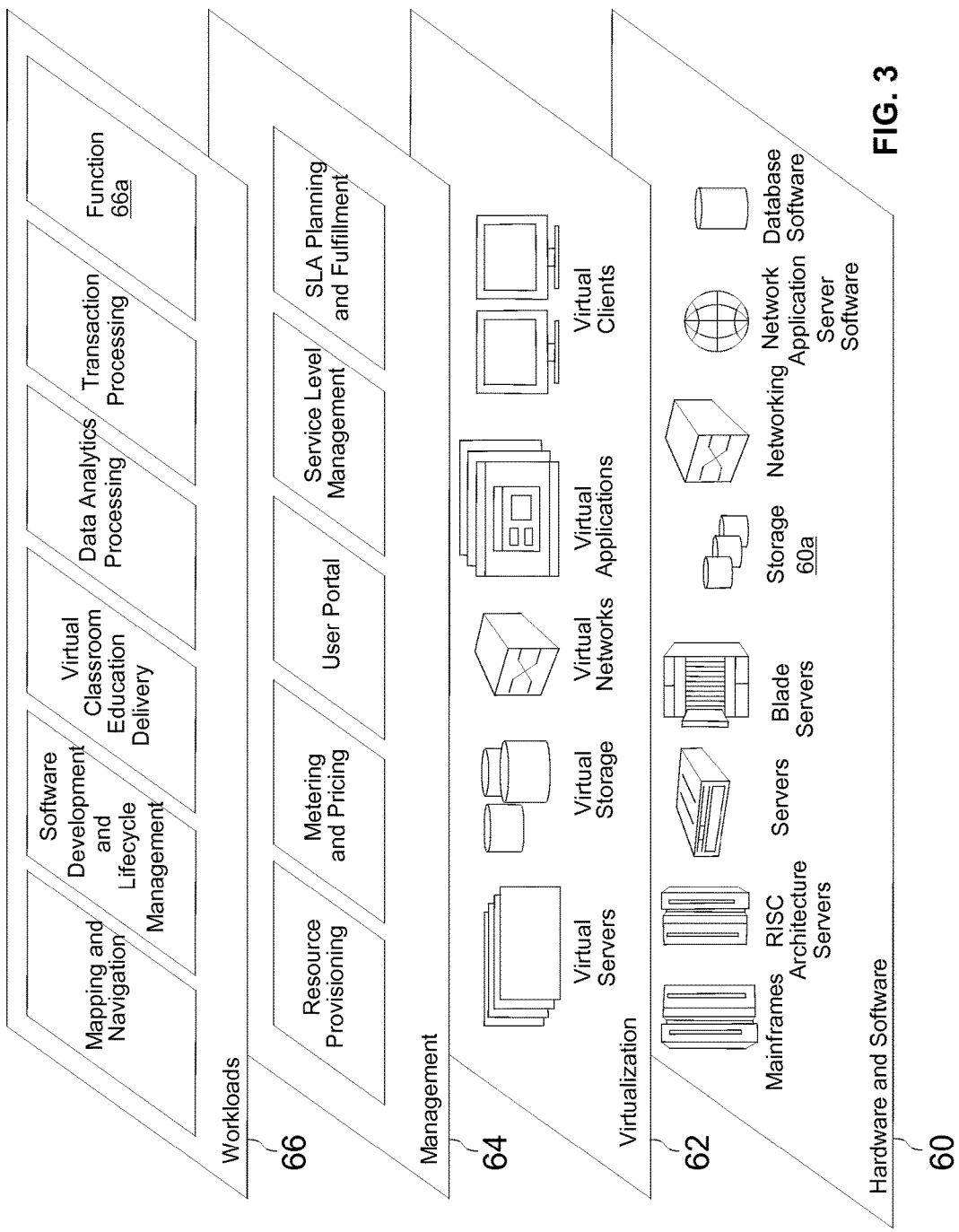
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

A mandatory part of the work of storage administrators is derived from requests which are sent to them from host administrators or application administrators. Examples for requests includes creating a storage space, moving storage space from one place to another, troubleshooting lowness, creating a mirror for a storage space, etc. Those requests are maintained in a ticketing system, and the storage administrator retrieves the request tickets from the ticketing system and handles them. The storage administrator translates the request to a set of operations needed in order to find the issue or run the operation requested. Manual intervention is needed here for translation of requests to commands in a management user interface (UI) application. The storage administrator needs to decide things according to what he knows and recognizes from the storage systems, using reports for trend analysis or viewing information from the management applications and analyzing it.

Some embodiments of the present invention provides a method to integrate a ticketing system into a storage management application/system. The method exposes API (application programming interface) to external tools or UI (user interface) that use the API to open tickets, and translate each ticket to a set of recommended operations automatically. The recommended operations/plane is notified and shown to a storage administrator as a set of actions and forms, giving the storage administrator the ability to change a step, remove, re-order or just play the set of actions (e.g., approve the ticket). Thus, the process of decision making in the storage world is improved. By automating this process it reduces the manual resources needed and improves the quality of the tickets handling.

Figure 4:
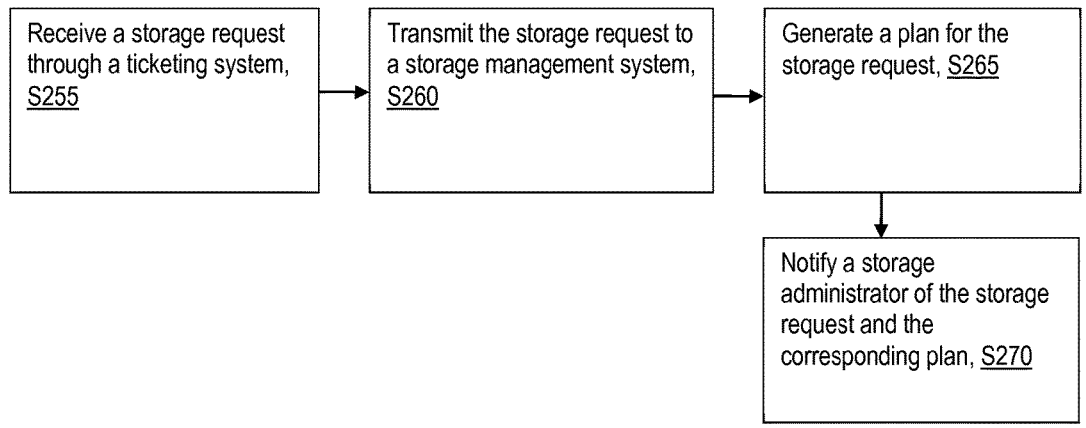
FIG. 4 is a flowchart showing a first embodiment method performed, at least in part, by the first embodiment system.
Figure 5:
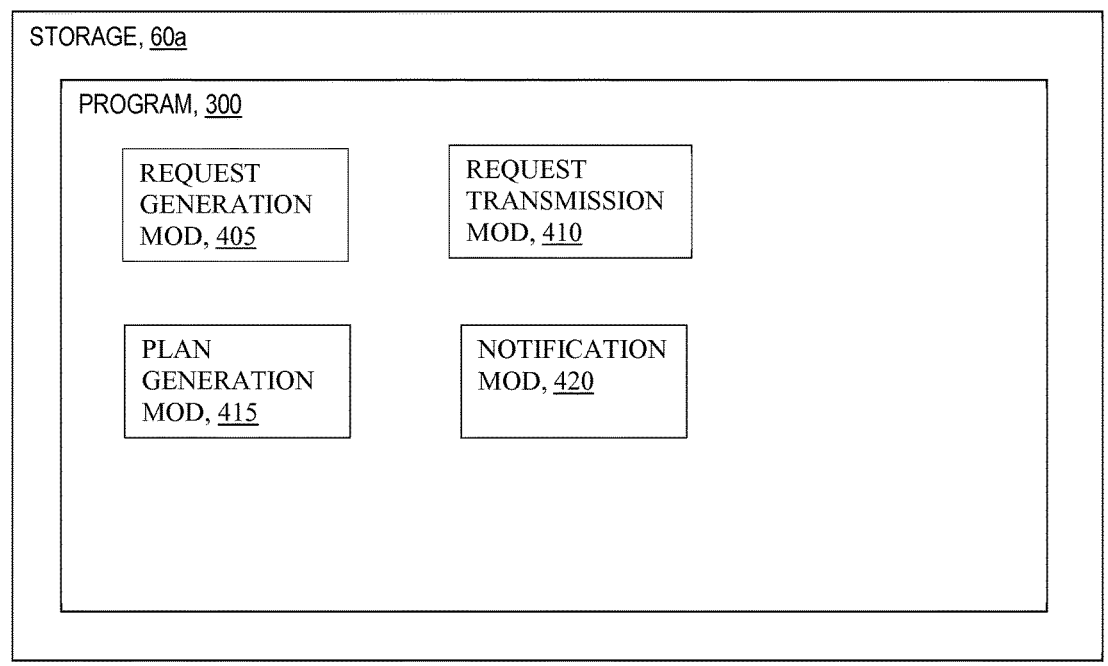
FIG. 5 is a block diagram showing a machine logic (for example, software) portion of the first embodiment system.

FIG. 4 shows flowchart 250 depicting a method according to the present invention. FIG. 5 shows program 300 for performing at least some of the method operations of flowchart 250. This method and associated software will now be discussed, over the course of the following paragraphs, with extensive reference to FIG. 4 (for the method operation blocks) and FIG. 5 (for the software blocks). One physical location where program 300 of FIG. 5 may be stored is in storage block 60a (see FIG. 3).

Processing begins at operation S255, where request generation module ("mod") 405 receives a storage request through a ticketing system. In this example, the ticketing system has an external API by which a user is able to make storage requests that relate to the storage in an organization.

The request may be made by the user through an external tool or user interface that employs the external API. The user herein may be a host administrator or an application administrator who makes the request through a local computing device such as 54A, 54B, 54C and 54N in FIG. 2. The host may be a cloud computing node 10 as shown in FIGS. 1 and 2, and the application may be running on one of such hosts. The request includes, but not limited to: (i) creating a storage space with a specified size that should be allowed to grow by a specific size per year; and (ii) mirroring such storage space to a machine in a different site, such as to a second cloud computing node that is different from the first cloud computing device on which the storage space is allocated.

Processing proceeds to operation 5260, where request transmission mod 410 transmits the storage request to a storage management application/system. In this example, whenever such a storage request is being made, the ticketing system sends this request to the storage management system via a proprietary API. For example, the storage requests may be exposed through a RESTful (Representational State Transfer) API to the storage management system. The management system's UI gets the API.

Processing proceeds to operation 5265, where plan generation mod 415 generates a plan for the storage request. In this example, the plan generation mod (also referred ticket analyzer mod) in the storage management system automatically search for a best solution to the request, that is, translate the request to the best suggested actions according to analysis. Such analysis is based on numerous parameters including, but not limited to: (i) an eco-system including all machines and hosts (e.g., cloud computing device 10 in FIG. 2) monitored by the storage management system; (ii) information which can be entered to the storage management system (e.g., policy controls and priorities); and/or (iii) other requests in the storage management system. When analyzing a single ticket, the other tickets may have effect on it. For example, the other requests may imply for complementary actions on the same storage objects (e.g., map a volume and resize it). Further, the other requests may limit the alternatives for solution of the current ticket. For example, a first request to shrink a pool may prevent a second request from creating new volumes in this pool. Another example, a first request to create a new volume which is followed by a second request to shrink a pool cannot be served by creating the new volume in the pool that should be shrunk.

Further, some embodiments include in the analysis the trends in the storage systems by considering the capacity and performance trends of storage objects. When performing decisions on storage objects, a very important parameter is to forecast the behavior of the storage objects in the future. The capacity and performance trend of a storage object may be predicted based on the capacity and performance trend of a similar storage object. For example, if a certain volume on a similar storage object (also referred to as a pool that holds this volume) is used to grow by 100 GB per month and the similar storage object is almost full, then the storage object on which the current request will be performed will be predicted to be full in the next months. The trend of a similar storage object can be reflected on the storage object on which the current request will be performed. Such mechanism can give the best suggestion to the request.

The output of the analysis in the ticket analyzer is a plan for each ticket—a suggested list of actions to handle the ticket. The plan may include the parameters which are involved in choosing this plan. For example, the plan may include: (i) choose the systems and pools that their capacity trend is going to allow a storage space growth. The storage management application would use the forecast it predicts to the systems and pools in the site by its capacity planning module; (ii) choose the systems that are connected to a target system in a different site. The management application has already the information of systems connectivity throughout all sites. In addition the management application would use its capacity planning module to check the target systems that allow the capacity growth specified in the request.

Processing proceed to end at operation 5270, where notification mod 420 notifies a storage administrator of the generated plan for the request. In this example, the management application exposes the plan using the UI, for example, a dedicated view for the request and its plan. Further, the management application notifies a storage administrator of the plan requested (not the ticket requested, but already the plan itself, as opposed to conventional ticketing systems). The notification may be sent from the management application to a registered device (e.g., mobile, or mail running the device). The device may be a local computing device such as 54A, 54B, 54C and 54N in FIG. 2. The notification may be a push nonfiction that wake up the mobile phone, and the storage administrator is able to display the plan on the mobile application and approve the plan to be executed. Alternatively, the storage administrator may login to the management UI application (e.g., via a mobile), the requested plan will display, for example, in the dedicated view. Further the storage administrator may be offered the ability to change a step, remove, re-order or just play the set of actions in the plan. Upon the approval by the storage administrator, the plan is executed in the background of the storage management system.

III. Further Comments and/or Embodiments

Some embodiments of the present invention recognize the following facts, potential problems and/or potential areas for improvement with respect to the current state of the art: (i) In conventional storage management application, the quality and the time it takes to handle the request ticket are deeply affected because of the manual nature of requests handling; (ii) the storage administrator may take the wrong decision and provide a non-ideal solution; (iii) analyzing each request manually and searching for the solution are time and resource consuming; (iv) in conventional storage management system, the storage administrators spend a considerable part of their time processing tickets, which can be saved by automating this process; and/or (v) the conventional ticketing systems are different applications than the storage administration applications, such that the storage administrators work is inherently divided between those two applications—the application which maintains the tickets, and the application in which the storage administrators operate in order to administer the storage system and run the commands that handle the tickets.

Some embodiments of the present invention may include one, or more, of the following features, characteristics and/or advantages: (i) the module that generates the automatic plans is integrated in the storage management application, so that it can utilize the entire data and mechanisms which the storage management application maintains; (ii) the automatic plan may be based on policy controls that the storage management application provides, and capacity trends which are computed in the storage management application and others; and/or (iii) minimum manual intervention and maximum automation are generated in a non-automated environment.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for automatically generating a plan for a storage request in a storage management system, the method comprising:
   receiving a storage request by a storage management system through a ticketing system via a RESTful API from a local computing device;
   analyzing the storage request with respect to a required set of policy controls, a required priority level, and concurrent storage requests;
   monitoring a set of logical storage space capacities respectively corresponding to a set of storage resource pools within the storage management system;
   identifying a set of similar storage resources within the set of storage resource pools that are capable of satisfying the storage request, the similar storage resources in the set of similar storage resources having a similar policy control that corresponds to the required set of policy controls and a similar priority level that corresponds to the required priority level;
   determining a set of capacity trends respectively corresponding to the similar storage resources including a rate of growth information dataset for each similar storage resource;
   identifying a first storage resource within the set of similar storage resources having a current capacity to satisfy the storage request;
   determining a predicted capacity of the first storage resource based on a capacity trend of a second storage resource in the set of similar storage resources;
   generating, by the storage management system, a set of recommended operations to be executed in a particular order responsive to the storage request, the set of recommended operations being based on the analysis of the storage request, the capacity trend of the second storage resource, and the first storage resource having the predicted capacity;
   notifying a storage administrator via the RESTful API of the set of recommended operations for review; and
   executing the set of recommended operations according to the particular order responsive to approval of the plan by the storage administrator;
   wherein:
   at least the step of generating a plan for the storage request is performed by computer software running on computer hardware.

2. The method of claim 1, wherein the storage request includes one of the following: (i) creating a logical storage space; (ii) allocating a logical storage space; and (iii) creating a mirror for a logical storage space.

3. The method of claim 1, wherein the set of actions includes choosing a storage resource pool from the set of resource pools having a set of desirable capacity trends indicative of an allowed capacity increase over time as specified in the storage request.

4. A computer program product for automatically generating a plan for a storage request in a storage management system, the computer program product comprising a computer readable storage medium having stored thereon:
   first program instructions programmed to receive a storage request through a ticketing system via a RESTful API from a local computing device;
   second program instructions programmed to analyze the storage request with respect to a set of required policy controls, a required priority level, and concurrent storage requests;
   third program instructions programmed to monitor a set of logical storage space capacities respectively corresponding to a set of storage resource pools within the storage management system;
   fourth program instructions programmed to identify a set of similar storage resources within the set of storage resource pools that are capable of satisfying the storage request, the similar storage resources in the set of similar storage resources having a similar policy control that corresponds to the required set of policy controls and a similar priority level that corresponds to the required priority level;
   fifth program instructions programmed to determine a set of capacity trends respectively corresponding to the similar storage resources including a rate of growth information dataset for each similar storage resource;
   sixth program instructions programmed to identify a first storage resource within the set of similar storage resources having a current capacity to satisfy the storage request;
   seventh program instructions programmed to determine a predicted capacity of the first storage resource based on a capacity trend of a second storage resource in the set of similar storage resources;
   eighth program instructions programmed to generate, by the storage management system, a set of recommended operations to be executed in a particular order responsive to the storage request, the set of recommended operations being based on the analysis of the storage request, the capacity trend of the second storage resource, and the first storage resource having the predicted capacity;

ninth program instructions programmed to notify a storage administrator via the RESTful API of the set of recommended operations for review; and tenth program instructions programmed to execute the set of recommended operations according to the particular order responsive to approval of the plan by the storage administrator.

5. The computer program product of claim 4, wherein the storage request includes one of the following: (i) creating a logical storage space; (ii) allocating a logical storage space; and (iii) creating a mirror for a logical storage space.

6. The computer program product of claim 4, wherein the set of recommended operations includes choosing a storage resource pool from the set of resource pools having a set of desirable capacity trends indicative of an allowed capacity increase over time as specified in the storage request.

7. A computer system for automatically generating a plan for a storage request in a storage management system, the computer system comprising:

a processor(s) set; and a computer readable storage medium;

wherein:

the processor set is structured, located, connected and/or programmed to run program instructions stored on the computer readable storage medium; and the program instructions include:

first program instructions programmed to receive a storage request through a ticketing system via a RESTful API from a local computing device;

second program instructions programmed to analyze the storage request with respect to a set of required policy controls, a required priority level, and concurrent storage requests;

third program instructions programmed to monitor a set of logical storage space capacities respectively corresponding to a set of storage resource pools within the storage management system;

fourth program instructions programmed to identify a set of similar storage resources within the set of storage resource pools that are capable of satisfying the storage request, the similar storage resources in the set of similar storage resources having a similar policy control that corresponds to the required set of policy controls and a similar priority level that corresponds to the required priority level;

fifth program instructions programmed to determine a set of capacity trends respectively corresponding to the similar storage resources including a rate of growth information dataset for each similar storage resource;

sixth program instructions programmed to identify a first storage resource within the set of similar storage resources having a current capacity to satisfy the storage request;

seventh program instructions programmed to determine a predicted capacity of the first storage resource based on a capacity trend of a second storage resource in the set of similar storage resources;

eighth program instructions programmed to generate, by the storage management system, a set of recommended operations to be executed in a particular order responsive to the storage request, the set of recommended operations being based on the analysis of the storage request, the capacity trend of the second storage resource, and the first storage resource having the predicted capacity;

ninth program instructions programmed to notify a storage administrator via the RESTful API of the set of recommended operations for review; and tenth program instructions programmed to execute the set of recommended operations according to the particular order responsive to approval of the plan by the storage administrator.

8. The computer system of claim 7, wherein the storage request includes one of the following: (i) creating a logical storage space; (ii) allocating a logical storage space; and (iii) creating a mirror for a logical storage space.

9. The method of claim 1, further comprising:

determining the set of required policy controls of the storage resource pools within the storage management system.

10. The method of claim 1, further comprising:

monitoring logical storage space performance of the set of similar storage resources to determine a set of performance trends;

determining a predicted performance of the first storage resource based on a performance trend of the second storage resource; and generating the set of recommended operations is further based on the predicted performance trend of the second storage resource.

11. The computer system of claim 7, wherein the set of recommended operations includes choosing a storage resource pool from the set of resource pools having a set of desirable capacity trends indicative of an allowed capacity increase over time as specified in the storage request.

* * * * *